H. E. FRY.
TREATMENT OF SEEDS.
APPLICATION FILED JUNE 3, 1916.
1,218,850.
Patented Mar. 13, 1917.
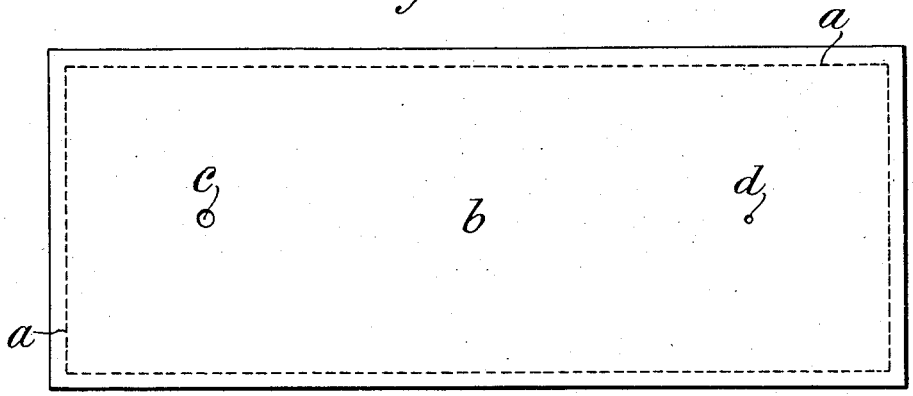
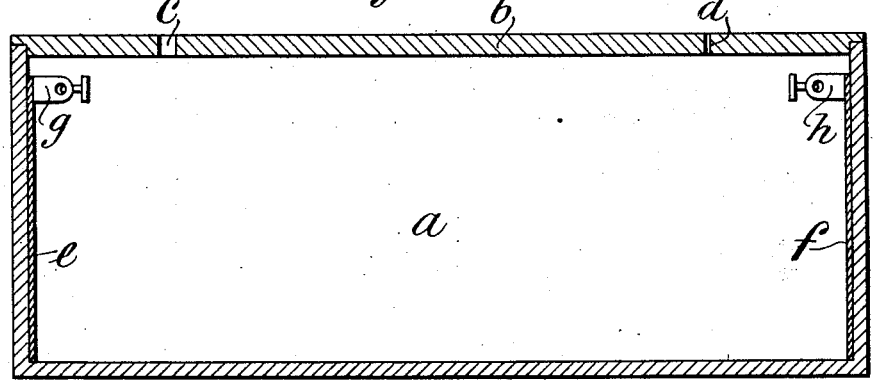
Inventor
Henry E. Fry
By his Attorneys
Baldwin & Wight

UNITED STATES PATENT OFFICE.

HENRY ERNEST FRY, OF GODMANSTONE, DORCHESTER, ENGLAND, ASSIGNOR TO CHARLES EDWARD DE WOLF, OF LONDON, ENGLAND.

TREATMENT OF SEEDS.

1,218,850. Specification of Letters Patent. Patented Mar. 13, 1917.

Application filed June 3, 1916. Serial No. 101,575.

*To all whom it may concern:*

Be it known that I, HENRY ERNEST FRY, a subject of the King of Great Britain, residing at Godmanstone, Dorchester, Dorset, England, have invented new and useful Improvements in the Treatment of Seeds, of which the following is a specification.

This invention relates to the treatment of seeds, more particularly cereals, in order to render them more productive.

According to this invention the seeds are steeped before they are sown in water or in a solution of organic or chemical manure (in which term I include iron salts) which is rendered radio-active, or in natural or mineral waters, especially those containing nitrogen or oxygen, which are already radio-active.

The drawings show an apparatus which may be used when treating seeds with radio-active waters or solutions.

Figure 1 is a plan and Fig. 2 a longitudinal section.

A rectangular wooden tank $a$ is preferably filled with the seeds to within three inches of the top and then closed with a well fitting cover $b$, which is provided with two apertures $c$ and $d$, one aperture $c$ being about one inch in diameter for the purpose of pouring in the radio-active waters or solutions, and the other $d$ being a small vent hole for the air to escape while the tank is being filled, after which both apertures are closed.

Electrodes $e$ and $f$ having terminals $g$ and $h$ are provided to allow of the application of electricity.

The duration of treatment depends on the character of the seeds, but wheat, is steeped preferably for twenty four hours, barley and oats for thirty six hours, and maize and cotton seed for forty eight hours. These times may be shortened if a current of electricity (preferably of low tension) is passed through the waters or solutions, for in such cases the duration of treatment of wheat is three hours, barley and oats four hours and maize and cotton seed five hours. The current of electricity should preferably be half an ampere for each bushel of seeds treated at the same time with a voltage sufficient to pass such a current through the waters or solutions. Electrodes of $\frac{1}{4}$th of an inch iron plates may be preferably used, which are placed in the tanks so as to cover completely their inside ends.

When the water or solution is not already radio-active it is rendered so by radium emanations in any known manner either before or after the seeds have been placed in the water or solution. This may be conveniently carried out in tanks such as are described above.

The solutions that are preferred contain either 2% of chlorid of sodium or $1\frac{1}{2}$% chlorid of sodium with $\frac{1}{2}$% chlorid of magnesia.

After treatment the seed is preferably sprinkled with petroleum or benzene and within a few hours it will be in condition for sowing.

In the following claims the term "radio-active water" is intended to cover water which is naturally radio-active and water which has been rendered radio-active; and the word "manure" covers both organic and chemical manure.

By the process described those parasites and micro-organisms which are detrimental to the seed are destroyed while the micro-organisms which are useful or necessary to the seed remain unharmed. Furthermore the solutions employed are antiseptic and when applied to the seed for limited and specific periods the detrimental organisms are destroyed and those which assimilate nitrogen remain alive and become active. The solutions are also of a fertilizing nature and hasten the germination of the seed and stimulate the growth of the embryo plant. By the use of an electric current the time of treatment is materially lessened.

What I claim is:—

1. The herein-described process of treating seeds before they are sown, which consists in steeping in a radio-active liquid.

2. The herein-described process of treating seeds before they are sown, which consists in steeping them in a radio-active solution of manure and water.

3. The herein-described process of treating seeds which consists in steeping them in a radio-active liquid, and passing an electric current through said liquid.

4. The herein-described process of treating seeds which consists in steeping them in a radio-active solution of manure and water, and passing an electric current through the solution.

HENRY ERNEST FRY.